United States Patent
Yamamoto (10) Patent No.: US 7,375,498 B2
(45) Date of Patent: May 20, 2008

(54) BATTERY PACK

(75) Inventor: Hiroyoshi Yamamoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 348 days.

(21) Appl. No.: 11/011,109

(22) Filed: Dec. 15, 2004

(65) Prior Publication Data

US 2005/0134232 A1    Jun. 23, 2005

(30) Foreign Application Priority Data

Dec. 17, 2003  (JP) ............................. 2003-420209

(51) Int. Cl.
*H02J 7/16* (2006.01)

(52) U.S. Cl. ...................... 320/150; 320/136

(58) Field of Classification Search ................ 320/150, 320/154, 136, 134, 160; 429/61, 62; 324/431, 324/441
See application file for complete search history.

(56) References Cited

U.S. PATENT DOCUMENTS

| | | | |
|---|---|---|---|
| 4,636,705 A * | 1/1987 | Bowman | 322/28 |
| 4,755,735 A * | 7/1988 | Inakagata | 320/150 |
| 5,218,285 A * | 6/1993 | Carlton et al. | 320/119 |
| 5,477,126 A * | 12/1995 | Shiojima | 320/138 |
| 5,497,068 A * | 3/1996 | Shiojima | 320/150 |
| 5,608,304 A | 3/1997 | Okumura | |
| 5,826,958 A | 10/1998 | Avitan | |
| 6,345,238 B1 * | 2/2002 | Goodwin | 702/130 |
| 2001/0011884 A1 * | 8/2001 | Sakakibara | 320/150 |
| 2001/0054878 A1 * | 12/2001 | Odaohhara | 320/118 |

FOREIGN PATENT DOCUMENTS

| | | |
|---|---|---|
| JP | 3-285522 | 12/1991 |
| JP | 6-81425 | 10/1994 |

OTHER PUBLICATIONS

Unitrode, Smart Power Switch, SLUS340- Apr. 1999, UC37132.*
International Rectifier, Quad Fully Protected Power Mosfet Switch, Oct. 16, 2002, IPS024G.*

* cited by examiner

*Primary Examiner*—Matthew V Nguyen
*Assistant Examiner*—Nguyen Tran
(74) *Attorney, Agent, or Firm*—Wenderoth, Lind & Ponack, L.L.P.

(57) ABSTRACT

A battery pack that determines battery temperature via a protection circuit which detects electrical resistance change in a temperature sensor thermally joined with the rechargeable batteries. The protection circuit is provided with a timing circuit that sets timing for battery temperature detection, or it is provided with a current detection section that detects current flowing in the batteries and detects battery temperature when battery current is greater than a set current. A protection circuit, provided with a timing circuit, measures battery temperature with a fixed period. A protection circuit with a current detection section, detects battery temperature when battery current is larger than the set current.

11 Claims, 7 Drawing Sheets

FIG.8

BATTERY PACK

BACKGROUND OF THE INVENTION

This invention relates to a battery pack containing a temperature sensor to detect battery temperature.

In a battery pack containing a temperature sensor, the temperature sensor detects battery temperature that has become abnormally high. This battery pack can be used safely because current flowing in the batteries is cut-off when battery temperature becomes abnormally high and exceeds a set temperature. Since a temperature sensor's electrical resistance changes with temperature, battery temperature can be detected by detecting electrical resistance. In the NTC (negative temperature coefficient) thermistor, which is one type of temperature sensor, electrical resistance decreases with increasing temperature. An NTC thermistor can be put in contact with a battery surface, and battery temperature can be detected by detecting the electrical resistance of the NTC thermistor. A battery pack containing a temperature sensor is described, for example, in the Japanese Patent Application Disclosure HEI 6-81425 (1994).

The battery pack disclosed in this patent reference houses a temperature sensor and a CPU (central processing unit). To reduce CPU power consumption, it is put in sleep-mode when no charging or discharging occurs over a one hour period, for example. Consequently, CPU power consumption is reduced when the battery pack is not used, and unnecessary battery discharge is prevented. However, for proper temperature detection, power consumption of the temperature sensor, which is a thermistor, is considerably large, and the system has the drawback that battery power is wastefully consumed. This is because thermistor electrical resistance is small at several tens of KΩ).

Figure 1:
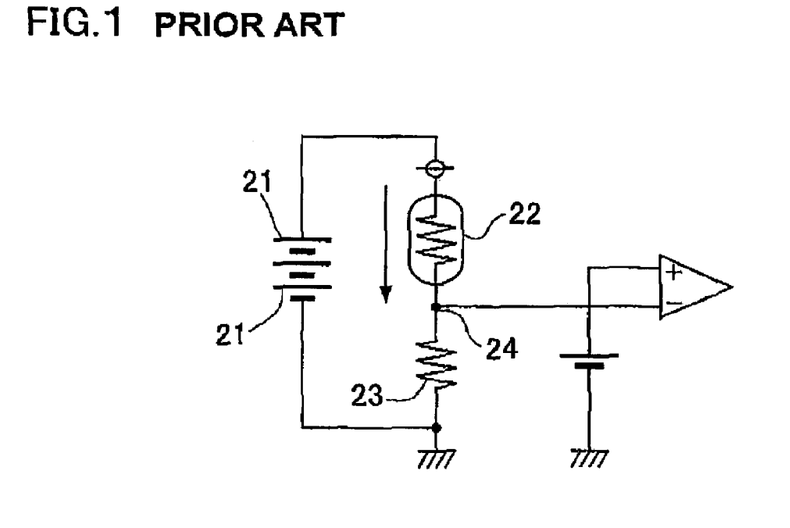
FIG. 1 is a circuit diagram showing an example of a prior-art thermistor circuit.

FIG. 1 shows a circuit using a thermistor to detect battery temperature. In the circuit shown in this figure, a series resistor 23 is connected to the thermistor 22 and voltage variation at the node connecting the thermistor 22 and series resistor 23 is detected to detect variation in the electrical resistance of the thermistor 22. In this circuit, when battery temperature becomes high and thermistor 22 electrical resistance changes, voltage at the node connecting the thermistor 22 and series resistor 23 increases. To accurately detect thermistor electrical resistance variation, namely battery temperature variation in this circuit, it is necessary to make the electrical resistance of the thermistor and the series resistor equal. However, if the thermistor 22 and series resistor 23 are equal, current flow in the series connection of thermistor and series resistor becomes large, and current consumed by the thermistor circuit becomes extremely large. Thermistor current can be reduced by increasing the size of the series resistor. However, if the electrical resistance of the series resistor is made very large with respect to thermistor resistance, it becomes impossible to accurately detect the electrical resistance variation of the thermistor. This is because voltage variation at the node connecting the thermistor and series resistor becomes small with respect to variation in thermistor electrical resistance. Consequently, for accurate detection of battery temperature, the electrical resistance of the series resistor cannot be made large, and power consumption by the thermistor circuit is high.

Figure 2:
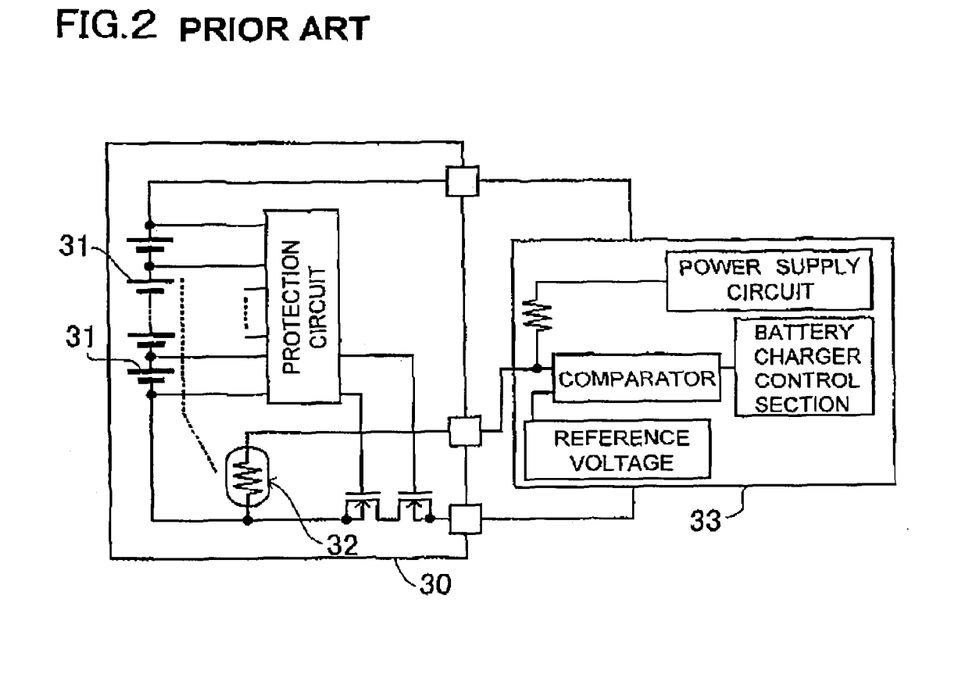
FIG. 2 is a circuit diagram showing an example of a prior-art battery pack.

FIG. 2 shows a circuit wherein the thermistor circuit does not consume battery power. In the battery pack 30 of this figure, power is not supplied to the thermistor circuit 32 from the batteries 31. Power is supplied to the thermistor circuit 32 from a battery charger 33. In this circuit configuration, it is possible for the thermistor circuit 32 to not consume battery power, but it is only possible to detect battery temperature when the battery charger 33 is connected. Therefore, battery temperature can only be detected when the battery pack 30 is being charged. If battery temperature becomes abnormally high during charging of this battery pack 30, charging current can be cut-off. However, if battery temperature becomes abnormally high during battery discharge, current flowing through the batteries cannot be cut-off.

SUMMARY OF THE INVENTION

The present invention was developed to resolve these types of drawbacks. Thus it is a primary object of the present invention to provide a battery pack that can accurately detect battery temperature while minimizing power consumption, and can nevertheless detect battery temperature during discharge.

The battery pack of the present invention is provided with rechargeable batteries, a temperature sensor in thermal contact with a battery to detect battery temperature via change in electrical resistance, a resistor connected in series with the temperature sensor, and a protection circuit to detect battery temperature from temperature sensor electrical resistance variation. The protection circuit is provided with a temperature measurement switch, a sample-and-hold circuit, and a timing circuit. The temperature measurement switch is connected in series with the series connected resistor and temperature sensor. With the temperature measurement switch in the ON state, battery power is supplied to the temperature sensor and series resistor, and in the OFF state, battery power is not supplied to the temperature sensor and series resistor. The sample-and-hold circuit detects and retains voltage at the measurement node, where voltage varies according to variation in temperature sensor electrical resistance. The timing circuit controls timing for the sample-and-hold circuit to sample and retain the detected voltage, and timing for switching the temperature measurement switch ON. In this battery pack, the timing circuit switches the temperature measurement switch ON and OFF with set periodicity. During the timing interval that the temperature measurement switch is ON, the detected voltage is sampled and retained by the sample-and-hold circuit, and battery temperature is determined via the sampled and retained voltage. In the battery pack of the present invention, instead of detecting battery temperature with set periodicity, current flowing in the batteries can also be detected by a current detection section, and battery temperature can be detected when battery current exceeds a set current.

This battery pack is also provided with rechargeable batteries, a temperature sensor in thermal contact with a battery to detect battery temperature via change in electrical resistance, a resistor connected in series with the temperature sensor, and a protection circuit to detect battery temperature from temperature sensor electrical resistance variation. Here the protection circuit is provided with a temperature measurement switch, a voltage detection circuit, and a current detection section. The temperature measurement switch is connected in series with the series connected resistor and temperature sensor. With the temperature measurement switch in the ON state, battery power is supplied to the temperature sensor and series resistor, and in the OFF state, battery power is not supplied to the temperature sensor and series resistor. The voltage detection circuit detects voltage at the measurement node, where voltage varies according to variation in temperature sensor electrical resistance. The current detection section detects current flowing in the batteries, and controls the temperature measurement switch ON when battery current exceeds a set current. In this battery pack, the current detection section detects current flowing in the batteries, controls the temperature measurement switch OFF for battery current less than the set current, and controls the temperature measurement switch ON for battery current greater than the set current. With the temperature measurement switch in the ON state, the voltage detection circuit detects voltage at the measurement node, and that detected voltage is used to determine the battery temperature.

The battery pack described above has the characteristic that in addition to being able to detect battery temperature during discharge, battery power consumption is drastically reduced, and furthermore battery temperature can be accurately detected. The battery pack described above can detect battery temperature during discharge and reduce power consumption because although battery power is supplied to the temperature sensor for temperature detection, power is not always supplied to the temperature sensor. Rather power is supplied to the temperature sensor temporarily at periodic intervals, or power is supplied only when battery current has become high. In a battery pack that detects battery temperature at periodic intervals, the time which battery temperature is detected can be made markedly short compared to the time which battery temperature is not detected. Therefore, battery temperature can be detected while average power supplied to the temperature sensor from the batteries is reduced to the extreme.

The battery pack of the present invention has a current cut-off FET (field effect transistor) connected in series with the batteries. When the voltage detected by the sample-and-hold circuit becomes a voltage that indicates battery temperature has exceeded the set temperature, the current cut-off FET can be switched from ON to OFF by the output signal from the sample-and-hold circuit, and battery current flow can be cut-off.

In the battery pack of the present invention, the temperature sensor can be a thermistor, a series resistor can be connected to the thermistor, and the node connecting the series resistor and thermistor can be connected to the input side of the sample-and-hold circuit as the measurement node. The thermistor can be connected to the power supply side and the series resistor can be connected to the ground side, or the thermistor can be connected to the ground side and the series resistor can be connected to the power supply side.

Further, the battery pack of the present invention can have an input switch connected to the input side of the voltage detection circuit. The current detection section can control this input switch ON and OFF, it can be turned ON for battery current greater than a set current, and in the ON state it can input the voltage induced by the temperature sensor into the voltage detection circuit.

Still further, the battery pack of the present invention can be provided with a plurality of series connected rechargeable batteries, and a voltage lowering device which decreases the total voltage of the rechargeable batteries. With the temperature measurement switch in the ON state, the voltage lowering device can supply power to the series connected temperature sensor and series resistor.

DETAILED DESCRIPTION OF THE INVENTION

The above and further objects and features of the invention will be more fully be apparent from the following detailed description with the accompanying drawings.

A battery pack, as shown in FIGS. 3-6, is provided with rechargeable batteries 1, 51, a temperature sensor 2, 52 to detect battery temperature via change in electrical resistance, a series resistor 3, 53 connected in series with the temperature sensor 2, 52 and conducting electricity from the internally housed rechargeable batteries 1, 51 to the temperature sensor 2, 52, and a protection circuit 4, 54 to detect voltage induced by the temperature sensor 2, 52 and determine battery temperature from the electrical resistance of the temperature sensor 2, 52.

The rechargeable batteries 1, 51 are series connected lithium ion batteries. However, nickel hydrogen batteries or nickel cadmium batteries can also be used as the rechargeable batteries. Further, although the figures show four rechargeable batteries 1, 51 connected in series, three or fewer rechargeable batteries, or five or more rechargeable batteries may also be housed in the battery pack.

The temperature sensor 2, 52 is an NTC thermistor. An NTC thermistor has the property that electrical resistance decreases with increase in detected battery temperature. However, any device which changes electrical resistance with temperature, for example, a device such as a PTC (positive temperature coefficient) thermistor, can also be used as the temperature sensor. The temperature sensor 2, 52 is thermally joined to a battery to detect battery temperature. A temperature sensor 2, 52 that is thermally joined to a battery can be, for example, fixed in direct contact with the surface of the battery, or in contact with the surface of the battery via a thermally conductive material such as silicone resin.

The series resistor 3, 53 is connected in series with the thermistor, which is the temperature sensor 2, 52. During battery temperature detection, battery power is supplied to the series connected temperature sensor 2, 52 and series resistor 3, 53. In the battery pack of the figures, a plurality of rechargeable batteries 1, 51 are connected in series to raise the output voltage. If high output voltage is directly supplied to the temperature sensor 2, 52 and series resistor 3, 53, it is possible to exceed the maximum voltage rating of the thermistor, as well as consuming a large amount of power. To reduce power consumption in this circuit, the battery pack of the figures is provided with a voltage lowering device 5, 55 (constant voltage source) to reduce the total voltage of the plurality of series connected rechargeable batteries 1, 51. The voltage lowering device 5, 55 is a regulator or DC-DC converter that outputs direct current battery voltage at a reduced voltage. Voltage lowering device 5, 55 output is also used as a power source for the comparator included in the protection circuit 4, 54. The battery pack does not necessarily always have to include a voltage lowering device. In a battery pack with no voltage lowering device, battery power is directly supplied to the series connected temperature sensor and series resistor. However, in that case, the comparison node is a resistor divider voltage instead of a constant voltage reference, and detection is made by comparison of resistor divider voltage ratios.

Electrical resistance of the temperature sensor 2, 52 varies with temperature. Therefore, electrical resistance of a temperature sensor 2, 52, thermally joined to a battery, varies in accordance with battery temperature. In the series connected circuit comprising the temperature sensor 2, 52 and series resistor 3, 53, voltage at the connection node between the temperature sensor 2, 52 and series resistor 3, 53 varies as the electrical resistance of the temperature sensor 2, 52 varies. Consequently, that connection node is taken as the measurement node 6, 56, and temperature sensor electrical resistance, namely battery temperature, can be detected by detecting the voltage at that measurement node 6, 56.

The protection circuit 4, 54 does not always continually detect battery temperature. In the protection circuit 4 housed in the battery pack of FIGS. 3 and 4, battery temperature is detected at set periodic intervals. In the protection circuit 54 housed in the battery pack of FIGS. 5 and 6, battery temperature is detected when current flow in the batteries becomes greater than a set value.

A temperature measurement switch 7, 57 is connected in series with the series connected temperature sensor 2, 52 and series resistor 3, 53. The temperature measurement switch 7, 57 is controlled ON for battery temperature detection and OFF when battery temperature is not detected. When the temperature measurement switch 7, 57 is turned ON, voltage at the measurement node 6, 66 is the voltage supplied from the batteries reduced by the voltage divider established by the electrical resistance of the temperature sensor 2, 52 and series resistor 3, 53. For example, if the electrical resistance of the temperature sensor 2, 52 and series resistor 3, 53 are equal, measurement node 6, 56 voltage will be half the voltage supplied to that series connection, which is half the voltage supplied by the voltage lowering device 5, 55 in the battery pack of the figures. If battery temperature increases and temperature sensor electrical resistance becomes half that of the series resistor 3, 53, voltage across the temperature sensor 2, 52 becomes half the voltage across the series resistor 3, 53: In that case, measurement node 6, 56 voltage becomes ⅔ the voltage supplied from the voltage lowering device 5, 55. Consequently, measurement node 6, 56 voltage can be detected, electrical resistance of the temperature sensor 2, 52 can be measured, and as a result, battery temperature can be detected from temperature sensor electrical resistance.

When the temperature measurement switch 7, 57 is turned OFF, no power is supplied to the temperature sensor 2, 52 and series resistor 3, 63. Since the temperature measurement switch in the battery pack of the figures is connected on the ground side, voltage at the measurement node 6, 56 goes to the voltage lowering device output voltage when the temperature measurement switch is turned OFF. Although not illustrated, the temperature measurement switch can also be connected on the power supply side instead of on the ground side. If the temperature measurement switch is connected on the power supply side and the temperature measurement switch is put in the OFF state, voltage at the measurement node 6, 56 will go to ground potential. In a battery pack with the temperature measurement switch connected on the ground side, the input switch discussed later can be omitted.

Figure 3:
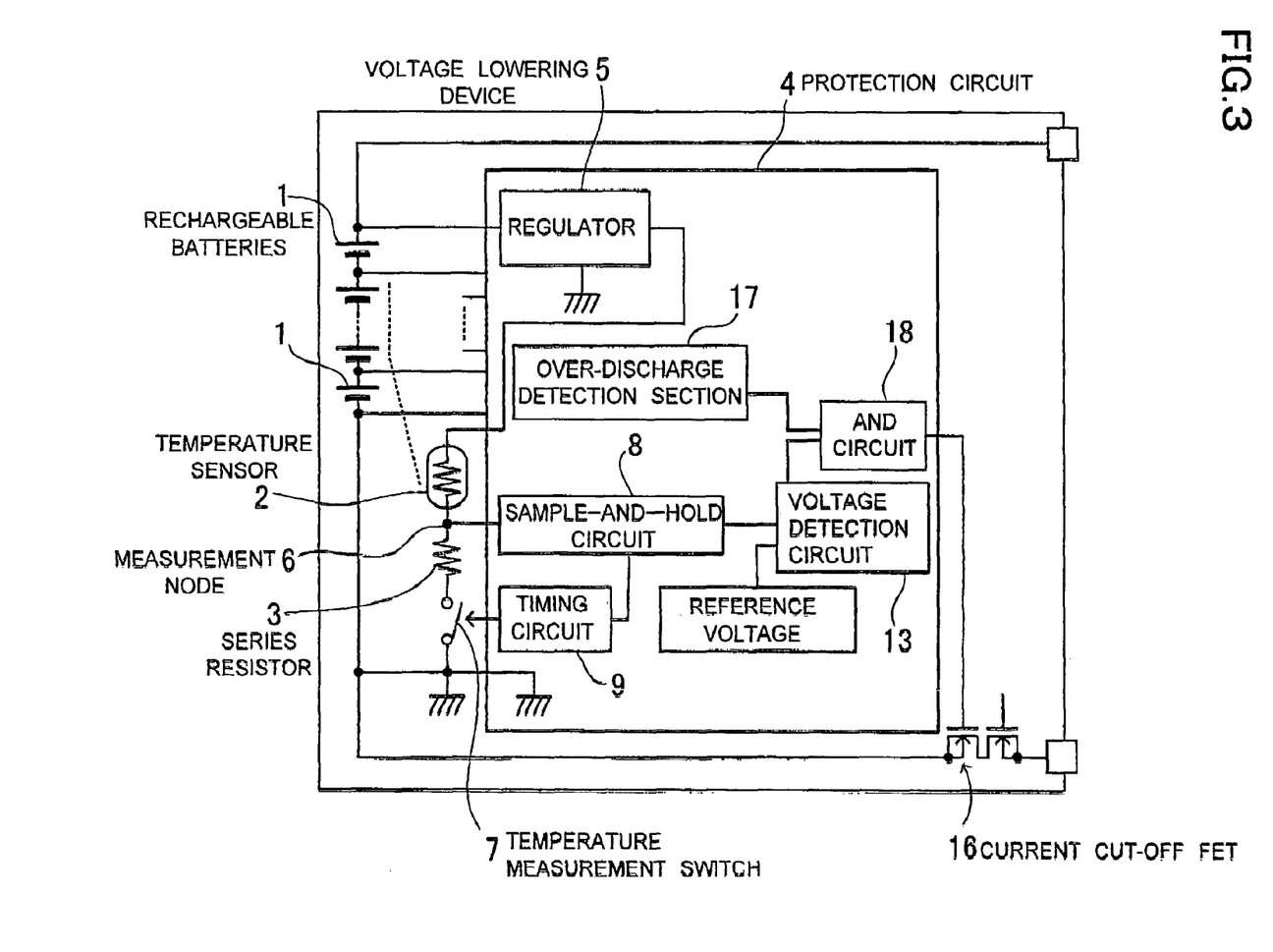
FIG. 3 is a circuit diagram of a battery pack for one embodiment of the present invention.
Figure 4:
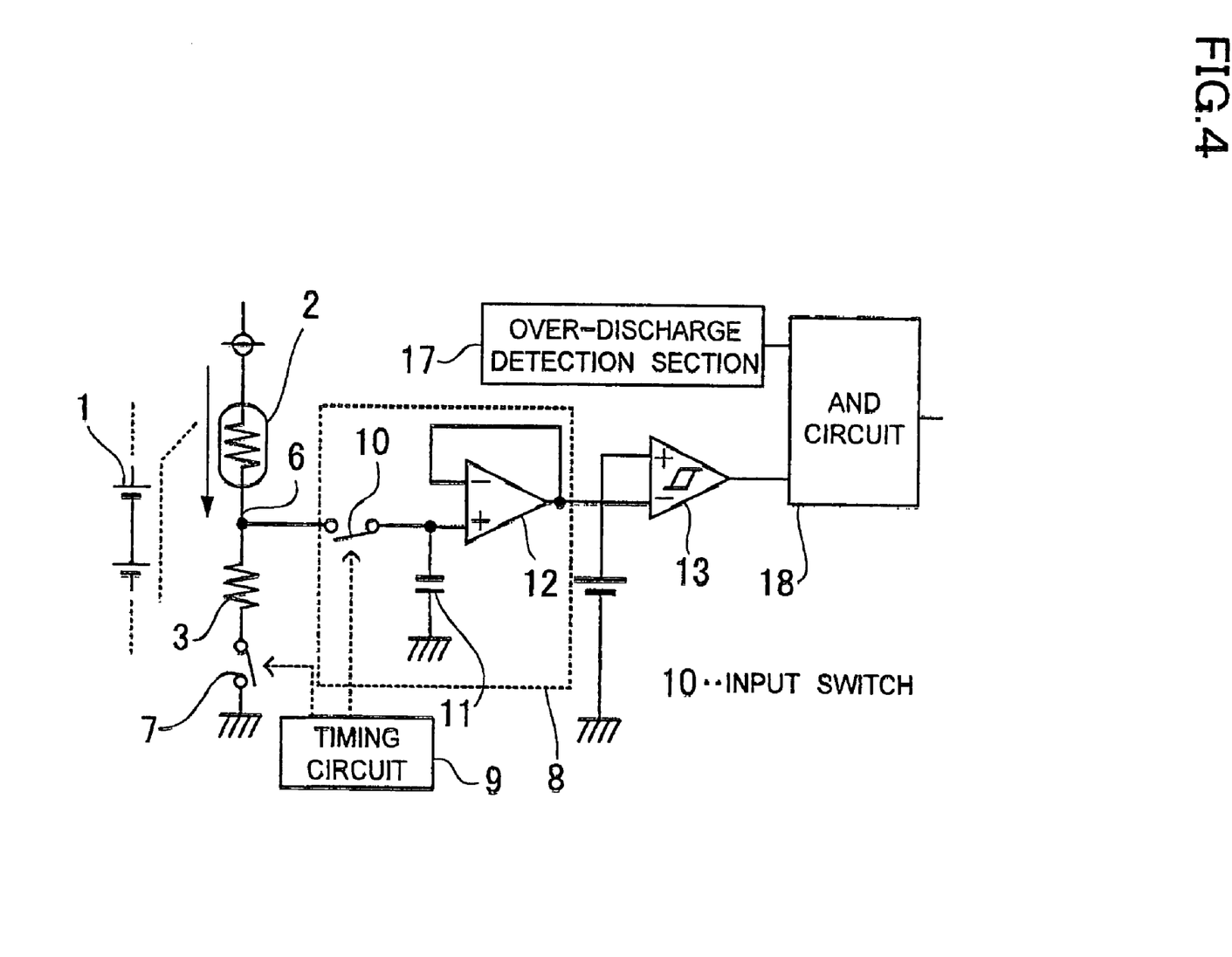
FIG. 4 is a circuit diagram showing a protection circuit for the battery pack of FIG. 3.

In the protection circuit 4 of FIGS. 3 and 4, the temperature measurement switch 7 is switched ON and OFF with set periodicity, and battery temperature is detected at a set period. This protection circuit 4 is provided with a timing circuit 9 which controls the temperature measurement switch 7, a sample-and-hold circuit 8 that detects and retains measurement node voltage, timing for sampling and retaining of the voltage detected by the sample-and-hold circuit 8, and timing for switching the temperature measurement switch 7 ON.

The sample-and-hold circuit 8 has its input side connected to the measurement node 6 via an input switch 10. The sample-and-hold circuit 8 of the figures is provided with a capacitor 11 to store the measured voltage, and a buffer amplifier 12 with the capacitor 11 connected to its input side. The buffer amplifier 12 is an op-amp (operational amplifier) with high input impedance configured as a gain-of-one amplifier with the capacitor 11 connected to its non-inverting (+) input and its output connected to its inverting (−) input. When the input switch 10 of the sample-and-hold circuit 8 is turned ON, input detected voltage charges the capacitor 11, and the capacitor 11 retains that detected voltage. When the input switch 10 is switched from ON to OFF, capacitor 11 voltage is retained at a fixed value and input to the buffer amplifier 12. The voltage capacitor 11 does not change because input impedance of the buffer amplifier 12 is extremely high and the capacitor 11 is not discharged. The buffer amplifier 12 outputs the voltage on the capacitor 11. In this sample-and-hold circuit 8, input detected voltage charges, and is retained by the capacitor 11 each time the input switch 10 is turned ON. Here, if the input impedance of the voltage detection circuit 13, which is a comparator, is high, the buffer amplifier 12 can be eliminated.

Figure 7:
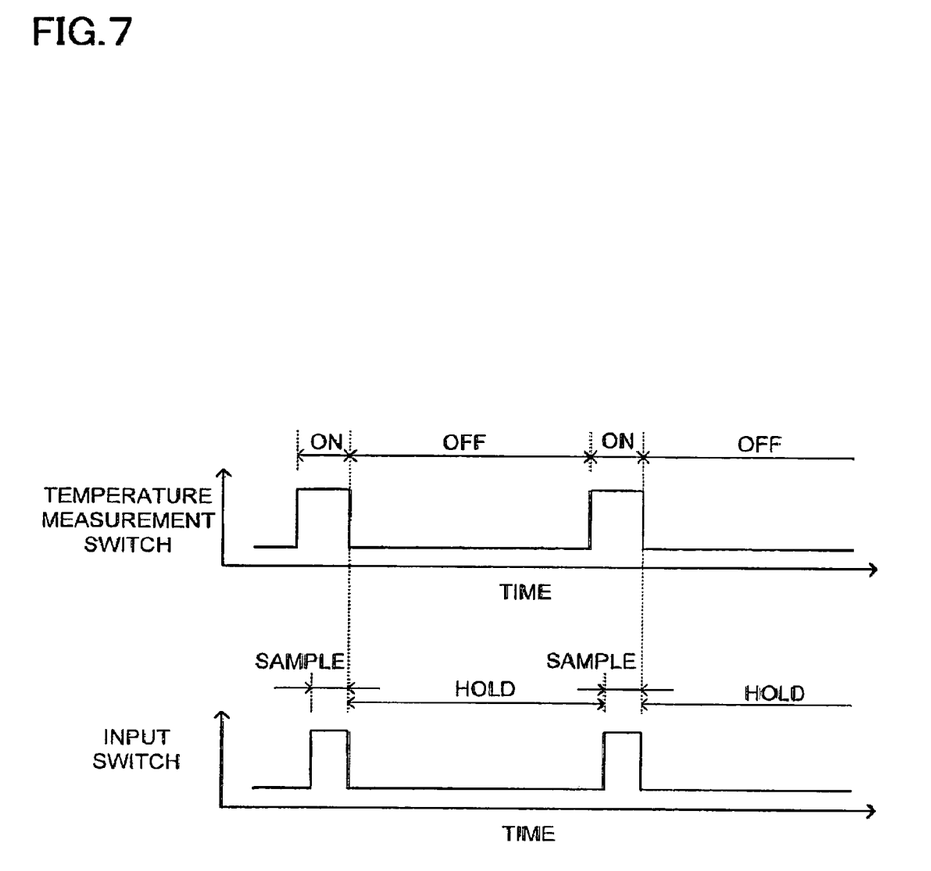
FIG. 7 is a timing diagram showing one example of timing circuit control of the temperature measurement switch and input switch.

The timing circuit 9 controls both the input switch 10 and temperature measurement switch 7 ON and OFF. The timing circuit 9 is an oscillator circuit that outputs a square wave such as a ring oscillator or astable multivibrator. FIG. 7 shows the output wave-form of the timing circuit 9. The timing circuit 9 turns the input switch 10 ON with the temperature measurement switch 7 in the ON state. Timing for switching the input switch 10 ON is slightly delayed from switching the temperature measurement switch 7 ON. This is for the purpose of first turning the temperature measurement switch 7 ON, then after voltage has been applied to the measurement node 6, the sample-and-hold circuit 8 can retain that measurement node 6 voltage. The timing circuit 9 switches the temperature measurement switch 7 and input switch ON and OFF at a set period. Timing is such that the temperature measurement switch 7 turns ON, the input switch 10 then turns ON, and the detected voltage is sampled and retained by the sample-and-hold circuit 8. The detected voltage, which is sampled and retained, is output by the sample-and-hold circuit 8 and battery temperature is detected from that output signal.

The period for the timing circuit 0 to turn ON the temperature measurement switch 7 is, for example, 1 sec to 10 sec. but is set corresponding to the thermal conduction rate and thermal capacity of the system being measured. The time that the timing circuit 9 has the temperature measurement switch in the ON state is a time interval that allows the sample-and-hold circuit 8 to sufficiently charge the capacitor 11 with the detected voltage. This ON time is, for example, adapted to the time constant and is 1 μsec to 100 msec, preferably 10 μsec to 10 msec, and still more preferably 100 μsec to 10 msec. Power consumption by the temperature sensor 2 and series resistor 3 can be reduced by lengthening the period at which the timing circuit 9 switches the temperature measurement switch 7 ON and OFF and shortening the time the temperature measurement switch 7 is ON. For example, If the period at which the timing circuit 9 switches the temperature measurement switch 7 ON and OFF is 1 min and the time the temperature measurement switch 7 is ON is 1 msec, time for power consumption by the temperature sensor 2 and series resistor 3 is drastically reduced to $1/60000$ the time for continual detection.

Figure 8:
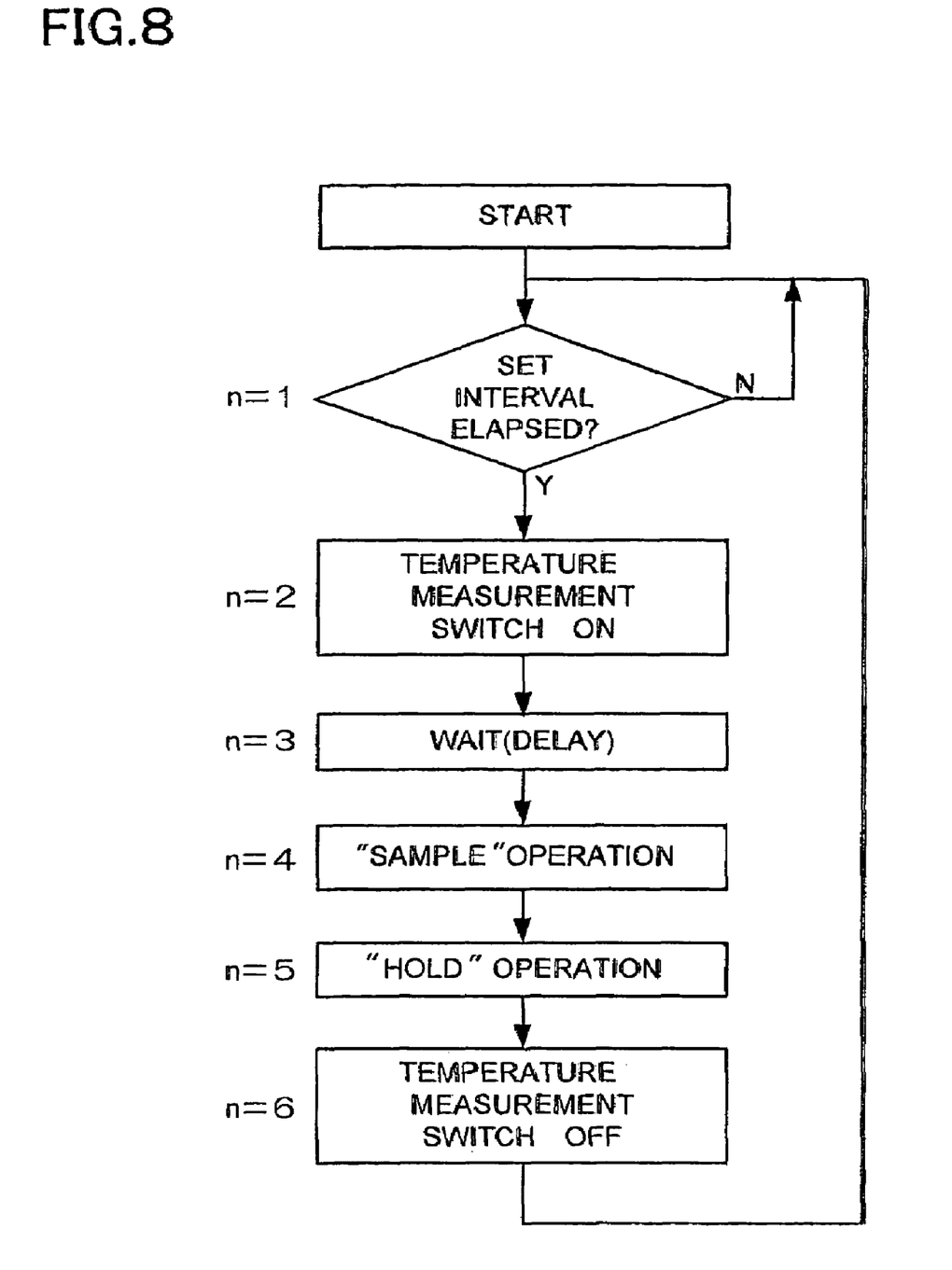
FIG. 8 is a flow-chart showing another example of timing circuit control of the temperature measurement switch and input switch.

A timing circuit containing a timer can control temperature sensor conduction ON and OFF in the following manner, as shown in the flow-chart of FIG. 8.

[step n=1]

This step loops until a set time interval has elapsed.

[step n=2]

When the set time interval has elapsed, the temperature measurement switch is turned ON by this step.

[steps n=3-5]

Subsequently, after a set delay time, measurement node voltage is input to the sample-and-hold circuit where it is sampled and retained.

[step n=6]

Subsequently, the temperature measurement switch is switched from ON to OFF and conduction to the temperature sensor and series resistor is cut-off.

The procedure loops through steps n=1 to n=6, and measurement node voltage is sampled, retained, and then output by the sample-and-hold circuit at a set time interval.

Figure 5:
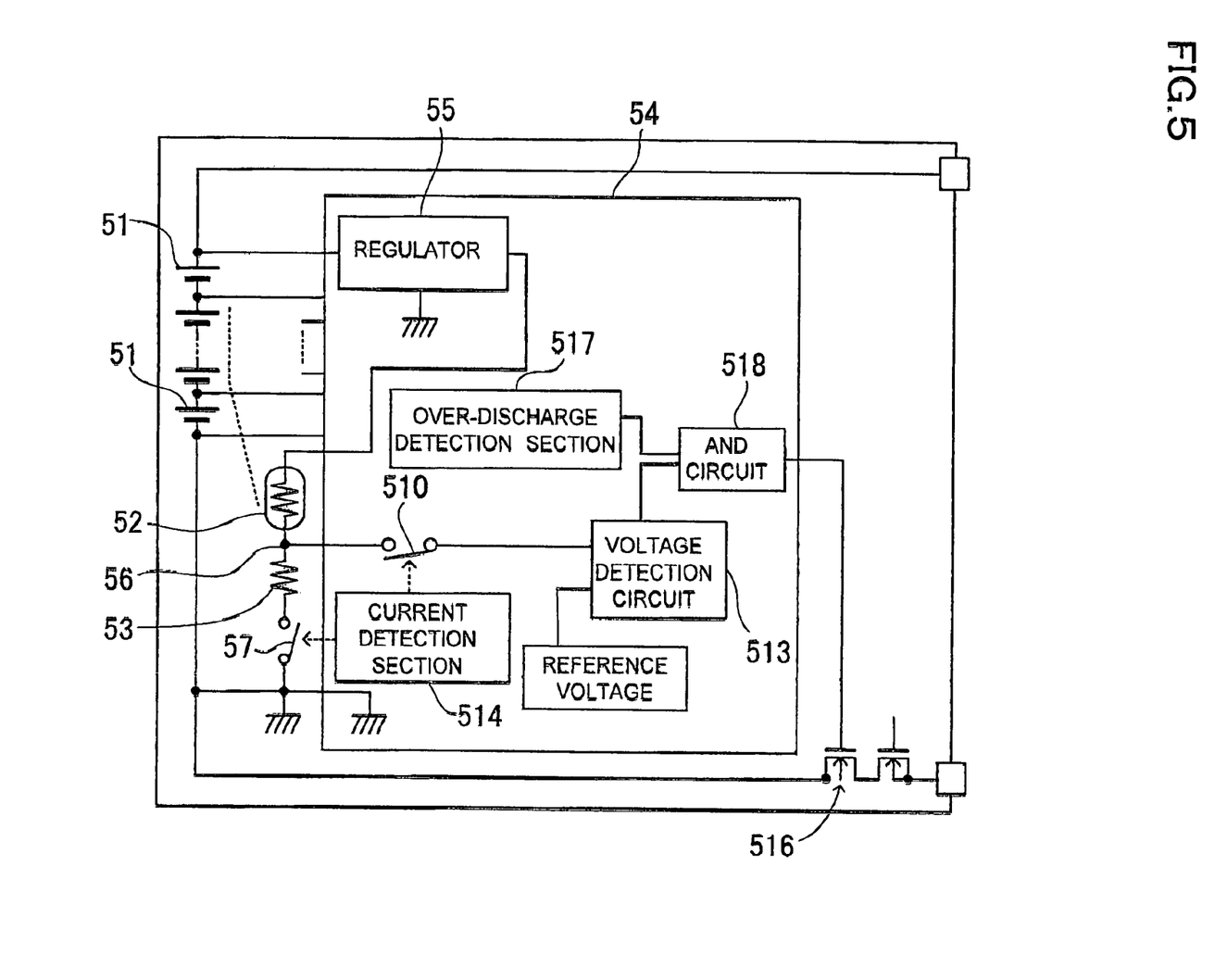
FIG. 5 is a circuit diagram of a battery pack for another embodiment of the present invention.
Figure 6:
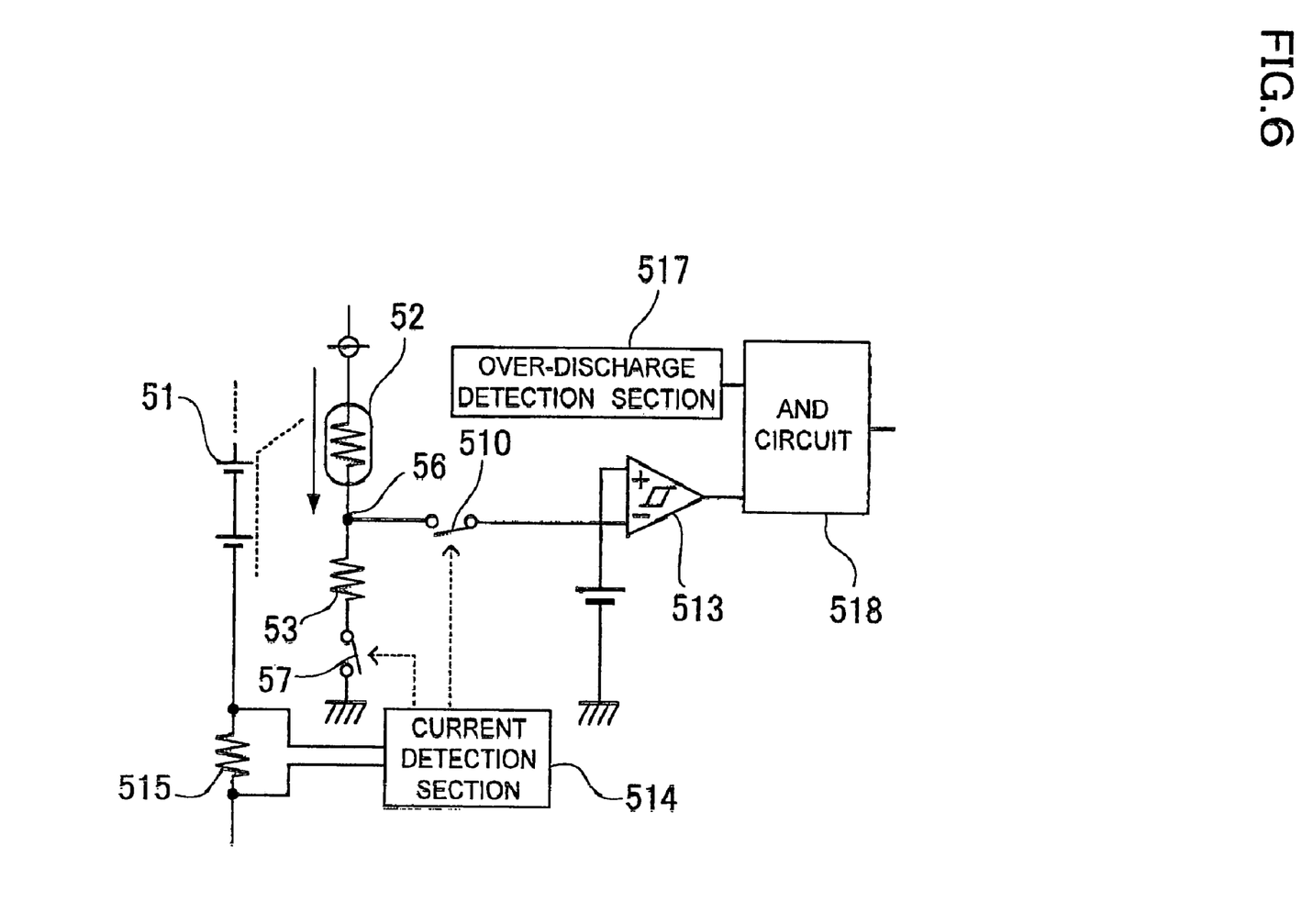
FIG. 6 is a circuit diagram showing a protection circuit for the battery pack of FIG. 5.

The battery pack of FIGS. 5 and 6 detects battery temperature only when battery current becomes larger than a set current. The protection circuit 54 of this battery pack is provided with a temperature measurement switch 57 that is turned ON to detect battery temperature, a voltage detection circuit 513 that detects the voltage at measurement node 56 which varies with the electrical resistance of temperature sensor 52, and a current detection section 514 that detects current flowing in the batteries and controls the temperature measurement switch 57 ON when battery current exceeds a set current.

In this battery pack, the current detection section 514 controls the temperature measurement switch 57 and input switch 510 to detect battery temperature. The current detection section 514 detects current flowing in the batteries, and only turns the temperature measurement switch 57 and input switch ON when battery current is greater than a set current. When the temperature measurement switch 57 and input switch are switched ON, voltage at measurement node 56 is detected and battery temperature is determined in the same manner as in the battery pack of FIGS. 3 and 4. The current detection section 514 is provided with a current sensing resistor 515 connected in series with the batteries, an amplifier (not illustrated) to amplify the voltage developed across the current sensing resistor 515, and a comparator (not illustrated) to compare amplifier output with a reference voltage. In this current detection section 514, when battery current becomes greater than the set current, amplifier output becomes greater than the reference voltage, and the comparator issues a signal to switch ON the temperature measurement switch 57 and input switch 510. When battery current is less than the set current, amplifier output is less than the reference voltage, and the difference amplifier (comparator) does not output a signal to turn ON the temperature measurement switch 57 and input switch 510.

Consequently, in this battery pack, the current detection section 514 detects current flowing in the batteries, the temperature measurement switch 57 is turned OFF for battery current less than the set current, and the temperature measurement switch 57 is turned ON for battery current greater than the set current. For the temperature measurement switch 57 and input switch in the ON state, the voltage detection circuit 513 detects voltage at measurement node 56, and battery temperature is determined from the detected voltage.

To determine whether or not battery temperature is greater than a set temperature, the battery packs of FIGS. 3 and 5 are provided with a voltage detection circuit 13, 513 to compare detected voltage at the measurement node 6, 56 with a reference voltage, and those battery packs are further provided with a current cut-off FET 16, 516 to cut-off current flowing in the batteries when battery temperature exceeds the set temperature.

The voltage detection circuit 13, 513 is a comparator with hysteresis, which compares input detected voltage with a reference voltage. The reference voltage is the voltage developed at the measurement node 6, 56 when battery temperature becomes the set temperature. In the voltage detection circuit 13, 513, when battery temperature becomes the set temperature, the detected voltage input from the sample-and-hold circuit 8 (FIG. 3), or the detected voltage input via the input switch 510 (FIG. 5) becomes the same as the reference voltage. When battery temperature becomes greater than the set temperature, the input detected voltage becomes greater than the reference voltage, and the voltage detection circuit 13, 513 outputs an OFF signal to switch OFF the current cut-off FET 16, 516. The OFF signal is input to the gate of the current cutoff FET 16, 516 to put that FET in a cut-off state. When battery temperature is lower than the set temperature, the detected voltage input to the voltage detection circuit 13, 513 becomes less than the reference voltage, and an ON signal is output. This ON signal puts the current cut-off FET 16, 516 in the ON state, and the batteries can be discharged.

For simplicity in FIGS. 3 and 5, only one gate is shown connected on the two FETs illustrated. Output from an over-charge detection signal and logic operations can also be connected to the gate of the uncommitted FET to prevent over-charge and to stop charging for abnormal battery temperature.

To prevent battery over-discharge, the battery pack of the figures is provided with an over-discharge detection section 17, 517 to detect battery discharge up to a state of over-discharge, and an AND circuit 18, 518 to connect the output side of the over-discharge detection section 17, 517 with the current cut-off FET 16, 516. The over-discharge detection section 17, 517 outputs an OFF signal when a battery discharges to a state of over-discharge. The AND circuit 18, 518 has output from the over-discharge detection section 17, 517 and the voltage detection circuit 13, 513 connected to its input side, and its output side is connected to the input side of the current cut-off FET 16, 516, which is the gate of the FET. The AND circuit 18, 518 outputs an OFF signal to turn the current cut-off FET 16, 516 OFF and cut-off battery current when either the over-discharge detection section 17, 517 or the voltage detection circuit 13, 513 issues an OFF signal. The AND circuit 18, 518 only outputs an ON signal when both the over-discharge detection section 17, 517 and the voltage detection circuit 13, 513 output an ON signal. When the AND circuit 18, 518 outputs an ON signal, the current cut-off FET 16, 516 is put in the ON state allowing battery discharge.

In the battery pack of FIG. 3, when battery temperature becomes greater than the set temperature, detected voltage output from the sample-and-hold circuit 8 becomes greater than the reference voltage of the voltage detection circuit 13. In the battery pack of FIG. 5, when battery temperature becomes greater than the set temperature, detected voltage input to the voltage detection circuit 513 from the measurement node 56 becomes greater than the reference voltage of the voltage detection circuit 513. In this state, the voltage detection circuit 13, 513 issues an OFF signal. The OFF signal output from the voltage detection circuit 13, 513 is input to the gate of the current cut-off FET 16, 516 via the AND circuit 18, 518 to switch the current cut-off FET from ON to OFF and cut-off battery current. Also in this battery pack, when a battery is discharged to an over-discharge state, the over-discharge detection section 17, 517 outputs an OFF signal. This output is also input to the gate of the current cut-off FET 16, 516 via the AND circuit 18, 518 to switch the current cut-off FET from ON to OFF and cut-off battery current. Therefore, in this battery pack, the current cut-off FET 16, 516 is only in the ON state to allow battery discharge when battery temperature is lower than the set temperature and further when battery over-discharge has not occurred as well.

In the battery pack embodiment described above, a thermistor is used in which electrical resistance decreases with increasing temperature, and the temperature sensor 2, 52 is connected to the power supply side while the series resistor 3, 53 is connected to the ground side of the circuit. In this circuit configuration, voltage at the measurement node 6, 56 rises as battery temperature rises. Consequently, battery temperature can be judged greater than the set temperature by detecting a voltage at the measurement node 6, 56 that is greater than the reference voltage. However, the temperature sensor can be connected to the ground side while the series resistor is connected to the power supply side of the circuit, and the detected voltage and reference voltage can also be connected to opposite inputs of the comparator. In addition, if a temperature sensor is used in which electrical resistance increases with increasing temperature, and the temperature sensor is connected to the power supply side while the series resistor is connected to the ground side of the circuit, measurement node voltage will decrease with increasing battery temperature. Further, if a temperature sensor such as a thermistor is used in which electrical resistance decreases with increasing temperature, and the temperature sensor is connected to the ground side while the series resistor is connected to the power supply side of the circuit, measurement node voltage will also decrease with increasing battery temperature. In a battery pack circuit configuration in which measurement node voltage decreases with increasing battery temperature, battery temperature is judged greater than the set temperature when measurement node voltage becomes less than the reference voltage.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims.

This application is based on application No. 2003420209 filed in Japan on Dec. 17, 2003, the content of which is incorporated hereinto by reference.

What is claimed is:

1. A battery pack comprising rechargeable batteries,
a temperature sensor thermally joined to the rechargeable batteries to detect battery temperature via change in electrical resistance,
a series resistor connected in series with the temperature sensor, and a protection circuit driven by the rechargeable batteries to detect battery temperature from change in the electrical resistance of the temperature sensor;
wherein the protection circuit is provided with a temperature measurement switch which is connected in series with the series connection of the temperature sensor and series resistor and which supplies battery power to the temperature sensor and series resistor in the ON state and does not supply battery power to the temperature sensor and series resistor in the OFF state to reduce power consumption of the rechargeable battery, a sample-and-hold circuit which detects and retains the voltage at a measurement node which changes voltage as temperature sensor electrical resistance changes, and a timing circuit which controls timing for sampling and retention of the detected voltage by the sample-and-hold circuit and timing for turning the temperature measurement switch ON,
wherein the timing circuit switches the temperature measurement switch ON and OFF with a fixed period, the sample-and-hold circuit samples and retains detected voltage when the temperature measurement switch is ON, and battery temperature is determined via the detected voltage which is sampled and retained.

2. A battery pack as recited in claim 1 wherein a current cut-off FET is connected in series with the batteries, and when the detected voltage sampled and retained by the sample-and-hold circuit becomes a voltage indicating battery temperature greater than a set temperature, an output signal from the sample-and-hold circuit switches the current cut-off FET from ON to OFF to cut-off current flowing in the batteries.

3. A battery pack as recited in claim 1 wherein the temperature sensor is a thermistor, the thermistor is connected to the series resistor, the connection node between the series resistor and thermistor is taken as the measurement node and connected to the input side of the sample-and-hold circuit, and the thermistor is connected to the power supply side while the series resistor is connected to the ground side of the circuit.

4. A battery pack as recited in claim 1 wherein the temperature sensor is a thermistor, the thermistor is connected to the series resistor, the connection node between the series resistor and thermistor is taken as the measurement node and connected to the input side of the sample-and-hold circuit, and the thermistor is connected to the ground side while the series resistor is connected to the power supply side of the circuit.

5. A battery pack as recited in claim 1 wherein the temperature sensor is an NTC thermistor in which electrical resistance decreases as battery temperature increases.

6. A battery pack as recited in claim 1 wherein the temperature sensor is a PTC thermistor in which electrical resistance increases as battery temperature increases.

7. A battery pack as recited in claim 1 wherein the temperature measurement switch is connected to the ground side of the circuit.

8. A battery pack as recited in claim 1 wherein the temperature measurement switch is connected to the power supply side of the circuit.

9. A battery pack as recited in claim 1 wherein the period at which the timing circuit turns the temperature measurement switch ON is from 1 sec to 10 min.

10. A battery pack as recited in claim 1 wherein the time that the timing circuit leaves the temperature measurement switch in the ON state is from 1 sec to 100 msec.

11. A battery pack as recited in claim 1 wherein a plurality of series connected rechargeable batteries and a voltage lowering device to reduce the total voltage of the rechargeable batteries are provided, and with the temperature measurement switch in the ON state, power is supplied from the voltage lowering device to the series connected temperature sensor and series resistor.

* * * * *